United States Patent [19]
Frenkel

[11] 3,786,833
[45] Jan. 22, 1974

[54] DIRECT-FLOW CYLINDRICAL VALVE

[76] Inventor: Mark Isaakovich Frenkel, ulitsa Karbysheva, 6, korpus 2, kv. 20, Leningrad, U.S.S.R.

[22] Filed: Mar. 31, 1972

[21] Appl. No.: 240,079

[52] U.S. Cl. .................... 137/512.15, 137/516.15
[51] Int. Cl. ............................................ F16k 15/16
[58] Field of Search....... 137/512.1, 512.15, 516.11, 137/516.15, 516.19, 525.3

[56] References Cited
UNITED STATES PATENTS

| 861,566 | 7/1907 | Wiki | 137/512.15 X |
| 1,672,436 | 6/1928 | Thege | 137/525.3 |
| 2,417,246 | 3/1947 | Ferguson | 137/525.3 |

FOREIGN PATENTS OR APPLICATIONS

| 682,618 | 3/1964 | Canada | 137/512.15 |
| 678,570 | 7/1939 | Germany | 137/516.11 |

*Primary Examiner*—Robert G. Nilson
*Attorney, Agent, or Firm*—Eric H. Waters et al.

[57] ABSTRACT

Direct-flow cylindrical valve comprising a pack of serially assembled elements, wherein each element includes adjoining ring-shaped members, for example a seat and a flexible plate. Provided on end faces of the seats are inlet passages for a working medium, in the form of radial slots open at the sides of one of the cylindrical surfaces of the seats, in such a manner that the medium washes the surfaces of the plates along the entire lengths of the slots. The seats also have radial outlet slots, a zigzag slot being formed in the valve, which allows the medium to flow from the inlet slots to the outlet slots.

4 Claims, 13 Drawing Figures

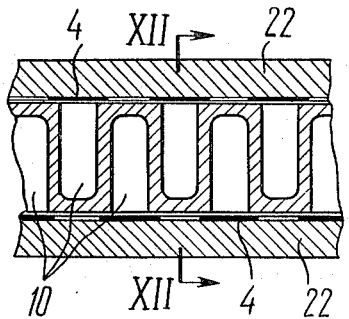 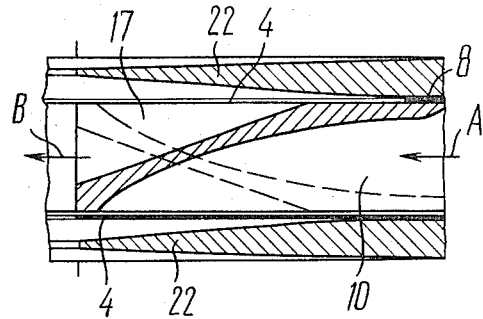
FIG. 11    FIG. 12
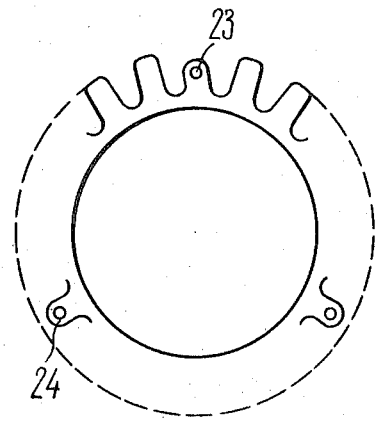
FIG. 13

DIRECT-FLOW CYLINDRICAL VALVE

The present invention relates to direct-flow cylindrical valves.

The invention can be employed in piston-type compressors and positive-displacement pumps including scavenging pumps for internal combustion engines.

Known in the art are direct-flow cylindrical valves comprising a pack assembled of serially arranged elements. Each element includes ring-shaped members: a seat and at least one flexible plate fastened along one of its circular edges.

Each seat is made of three rings matched with one another so that passages for a working medium are formed inside the seat between the rings.

When the valve is opened, the plate bends and rises with its free edge under which there is formed a circular slot, forming an outlet for the medium (e.g. gas). In this valve the length of the slot under each plate is equal to the total length of the free edge, and this fact, at a low rising height of the free edge stemming from the strength conditions, limits the pass-through section in the valve slot and makes it difficult to reduce its resistance.

The seats made in such a manner, i.e. having internal passages, feature a considerable height which under the conditions of low rise of the free edge of the plates hinders the development of a compact valve having a high discharge capacity.

This is also due to the fact that any change in the direction of the flow in the internal passages offers an additional local resistance, thereby increasing the total hydraulic resistance of the valve.

Due to the presence of seats having a considerable height, the known valves are characterized by a considerable "dead volume," and this fact is also one of the disadvantages of the known valves.

Moreover, the compound seats made of three matched rings are very complex in manufacture.

An object of the present invention is to provide a valve having a great number of seats and plates, which fact increases the discharge capacity of the valve and considerably reduces the "dead volume" within the same.

This and other objects are attained by providing a direct-flow cylindrical valve comprising a pack assembled of serially arranged elements, each including ring-shaped members: a seat having inlet passages for a working medium, (e.g. gas), and at least one flexible plate clamped along one of its circular edges, said elements adjoining one another. According to the invention, the inlet passages for the working medium are made in the form of radial slots disposed at least along one end face of each seat and open on the side of one of its cylindrical surfaces, so that the working medium washes the plate surfaces along the entire lengths of the slots.

When the radial slots are arranged on both end faces of the seats, the valve elements may incorporate rings adjoining the plates at the places opposite to those sides of the latter which adjoin the seats, said rings having chamfered surfaces on the sides facing the plates, for provision of bending of the plates in the open valve.

In order to increase the discharge capacity of the valve, it is advisable to make radial outlet slots for the working medium between the radial inlet slots at the end faces of the seats where the plates join the seat, said outlet slots being open at the sides of the cylindrical surfaces opposite to those facing the openings of the inlet slots, in such a manner that a zigzag slot is formed in the open valve, through which the working medium flows from the inlet slots to the outlet slots.

The discharge capacity of the valve can be further increased if each flexible plate is provided with teeth having different heights and shapes and which are disposed along the contours of the zigzag slot so that the bases of the teeth are near the fixed edges of the plates.

In modifications of the inventive valves a high discharge capacity is provided due to the fact that the teeth of the plates are disposed opposite to respective inlet slots. For the same purpose, each tooth of the plates can be located opposite to several inlet slots.

Other objects and advantages of the invention will be apparent from the following detailed description of some embodiments of the invention, reference being made to the accompanying drawings in which:

FIG. 11 is part of the valve pack with toothed plates adjoining both end faces of the seat and disposed in a single plane, with slots for inlet and outlet of the working medium located at the opposite end faces of the seats;

FIG. 12 is a view along the line XII—XII in FIG. 11; and

FIG. 13 is a schematic diagram of the plate with several teeth and eyes for screws connecting the pack.

Figure 1:
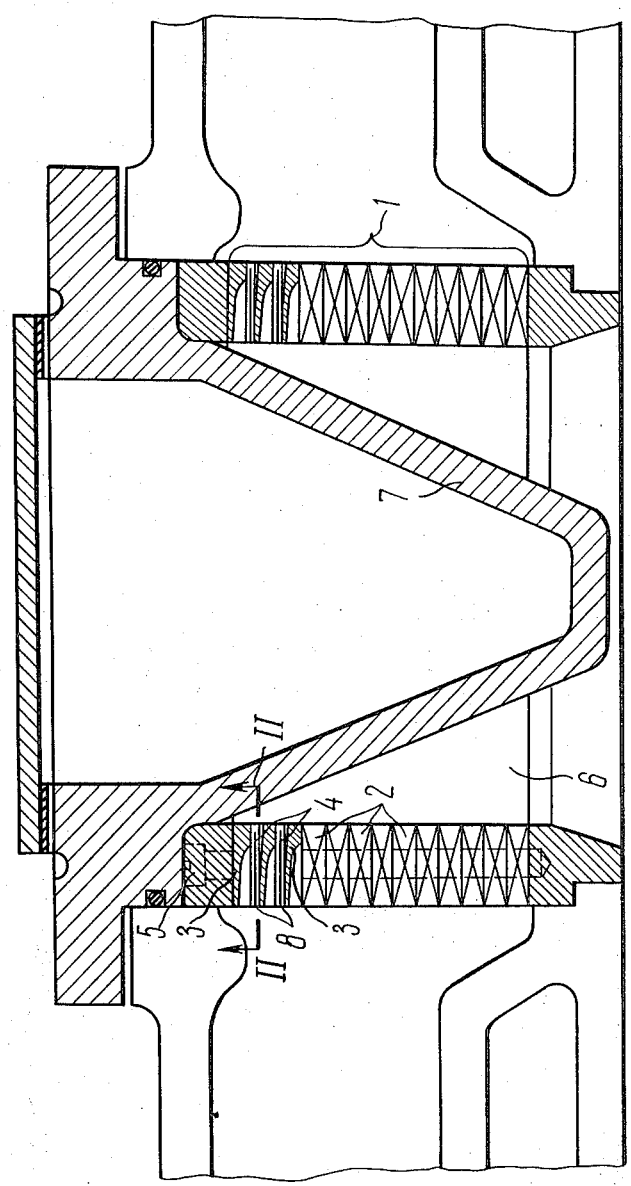
FIG. 1 is a schematic cross-sectional view of conventionally arranged valves designed for inlet or suction (left-hand side) and for outlet or injection (right-hand side)

The direct-flow cylindrical valve comprises a pack 1 (FIG. 1) assembled of serially arranged elements 2. Each element includes a seat 3 and at least one flexible plate 4, these parts adjoining each other.

The elements 2 of the valve assembled into the pack 1 are secured with screws 5. In order to reduce the "dead volume" within the inner space 6 of the valve, there is provided a displacing cone 7.

Figure 2:
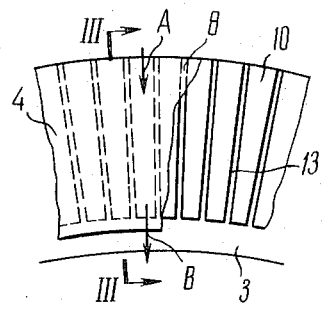
FIG. 2 is a view along the line II—II in FIG. 1, showing a portion of the element of the inlet valves whose seat is partially covered with a plate clamped along the external circular edge.

The plates 4 are disposed between the adjacent seats 3 so that one part of the plates 4, disposed at the inlet of a working medium (e.g. gas) into the valve (along the arrows A in FIG. 2), is clamped along one of circular edges 8 by said seats 3 and, therefore, is stationary (the direction of the inlet of the working medium is shown by an arrow in FIG. 2).

The plates of the suction valve are clamped along their external edges, while the plates of the delivery valve are clamped along the internal edges. The other parts of the plates remain free, and they bend under the action of the working medium flowing through the valve and along the plate 4 (in FIGS. 3, 4 the bent plate is shown by a dotted line), thus opening slots 9 for passing the working medium, between the plate 4 and the seat 3.

Each valve seat 3 has passages for inlet of the working medium made in the form of radial slots 10 arranged on at least one end face 11 (FIGS. 3 and 4) of the seat and opened near one of its cylindrical surfaces 12. Such a construction of the slots provides for washing the surfaces of the plates by the working medium along the entire length of the slots.

The radial slots 10 arranged in each seat near its joint with the plate are divided by partitions 13 supporting the flexible plate 4 so that its bendings within the slots 10 and the appearing bending stresses do not lie beyond allowable limits.

The seat surface at the side opposite to the plane of joining the plate is made with a chamfer 14 beyond the stationary edge 8 of the plate, providing for bending of the plate in the open valve.

In order to increase the pass-through section of the radial slots 10 so as to reduce the friction of the flowing medium about the slot walls and, therefore, to reduce the losses of energy in the valve, the slots 10 communicate with both end faces of the seats, while each valve element comprises a ring 15 (FIG. 4) which adjoins the respective plate 4 on the side opposite to that side of the plate which adjoins the seat 3. The ring 15 has chamfered surfaces 16 facing the plates and allowing them to bend within the open valve.

The outlet slot is the narrowest section to be passed by the flow in the valve. The slots of the direct-flow cylindrical valve are disposed on a circle under the internal edge of the plates (in the suction valve) or under the external edges of the plates (in the delivery valve).

To increase the pass-through section of the slot, the present invention envisages seats made in such a manner that the outlet slot is zigzaged along a closed contour and is much longer than when it extends along a circle.

Figure 5:
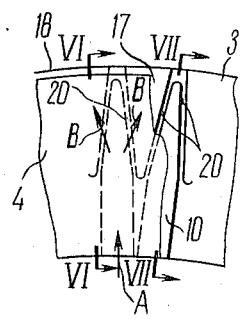
FIG. 5 is a part of an element of the delivery valve, whose seat is provided with inlet slots for a working medium and with outlet slots for the same.
Figure 6:
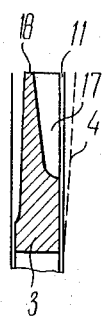
FIG. 6 is a view along the line VI—VI in FIG. 5.

In the seats of this kind, between the radial inlet slots 10 on the end faces 11 of the seats at the joints between the seat 3 and the plates 4, there are located radial slots 17 (FIGS. 5 and 6) for the outlet of the medium. Said slots 17 are open on the sides of cylindrical surfaces 18, which are opposite to those facing the openings of the inlet slots 10.

Figure 7:
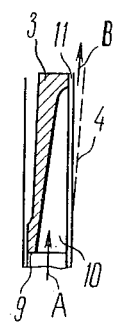
FIG. 7 is a view along the line VII—VII in FIG. 5.

Such disposition of the slots 10 and 17 (FIG. 7), correspondingly for the inlet and the outlet of the working medium, provides for a zigzag slot 19 in the open valve for flowing of the working medium from the inlet slots to the outlet slots, the length of this zigzag slot exceeding the length of the circle of the free edge of the plate, in which case the slot area and the pass-through section are increased, while the energy losses in the valve are reduced. The slots 10 may be of the single-type (FIG. 5) or the double-type, i.e. be divided by a longitudinal partition.

The cross-sectional area of the inlet passages 10 is gradually reduced, while that of the outlet passages 17 is increased, depending on the conditions of medium flow through the zigzag slot between the inlet and outlet passages.

In connection with an increase in the pass-through section in the slot, the same section must also be increased in the seat. For this purpose, the inlet passages 4 of the seats are made deeper than in the seats in FIG. 2 having no outlet passages. The amount of seats and plates is reduced due to the increase in the discharge capacity of each element. This fact simplifies the manufacture of the valve and reduces the number of plates.

The increase in the length of the slot makes it possible to reduce the rise height of the plates. This is very important for prolonging their life, first of all, in high-speed compressors.

Figure 8:
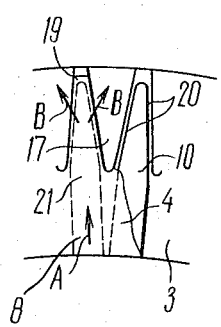
FIG. 8 is part of the element of the delivery valve, whose plates are provided with teeth.
Figure 9:
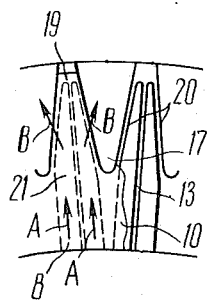
FIG. 9 is part of the element with a plate, each of the teeth of which is disposed above two inlet slots for a working medium.
Figure 10:
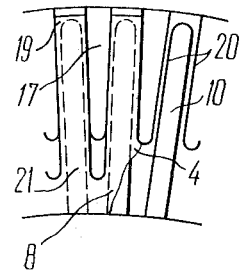
FIG. 10 is part of the element with a plate whose teeth have a rectangular shape.

In the above-mentioned valves, where the inlet passages alternate with outlet passages, the plates may be made not only in the form of conventional circular members (FIG. 5), but can be provided with teeth 20 (FIGS. 8, 9 and 10). The teeth are located along the contour of a zigzag slot 20 in such a manner that the bases 21 of the teeth 20 are located at the sides of the fastened edges 8 of the plates 4.

In particular, the plates may be provided with teeth whose shape is close to that of triangular (FIG. 8), trapezoidal (FIG. 9) and rectangular (FIG. 10) teeth.

The presence of the teeth increases the discharge capacity of the valve at a partial rise of the plate, since a portion of the medium flowing through the valve slot by-passes the teeth and then flows in the gap between the rear side of the valve plate and the surface of the rise limiter.

The toothed plates possess a higher mechanical strength because they have no portions hanging above the slots for outlet of the working medium where high bending stresses appear during the impact with the seat.

The basic advantage of the ring-shaped plates with teeth is that their rigidity, hindering the opening of the valve, is much lower than that of the toothless ring-shaped plates subjected to conical deformation during the opening of the valve. Since the rise height of the saw-tooth plates is small due to a large perimeter of the slot, the complete opening of the valve equipped with such plates involves only low pressure losses.

The positive result of a low rise height of the toothed plates and the absence of portions in such plates above the outlet passages, where high stresses appear, consists in a considerable increase in the life of these plates. Moreover, the radial width of the plates and seats can be considerably reduced due to the reduced rigidity and rise height thereof, and this is particularly important for reducing the dimensions of the valves.

Provided on the seat above each tooth may be one (FIG. 8), two (FIG. 9) or more inlet passages 10. The construction with several inlet passages is expedient in the case of the wide plates with a relatively high rise because the inlet passages with an increased pass-through sections are required only at a great area of the passage in the slot above one tooth. However, the width of the inlet passages is to be limited to avoid bending of the plate. This width is reduced in the case of thin plates and high difference in the pressure acting on the closed valve.

The width of the teeth is gradually reduced with the distance from the base (FIGS. 8 and 9). However, for the sake of simplifying the construction, the slots are made with a constant width (FIG. 10) and, correspondingly, the plate teeth are made rectangular, in which case each tooth can cover one or several inlet slots.

In the case of toothed plates, the mutual disposition of the inlet and outlet slots is the same as in the case of the valve with a zigzag slot (FIGS. 5, 6 and 7) and toothless plates, in which case the depth of the inlet slots is reduced in the direction of the flow of working medium, while that of the outlet slots is increased.

Figure 3:
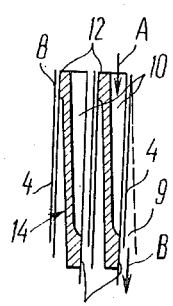
FIG. 3 is a view along the line III—III in FIG. 2, showing a portion of a pack of the inlet valve, whose plates adjoin one of the end faces of the seats.
Figure 4:
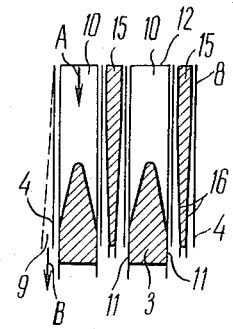
FIG. 4 is a cross-sectional view of part of the pack of the inlet valve, whose plates adjoin both end faces of the seats, in which case each of the plates adjoins a seat at one side and adjoins a ring with chamfered surfaces at the other side.

The plates 4 with the teeth 20 can be used both in combination with the seats in which the plates 4 adjoin one end face 11 (as shown in FIG. 3) or in combination with the seats in which they adjoin both end faces (as shown in FIG. 4). In the last case a bi-chamfered intermediate member 22, similar to the ring 15 in FIG. 4, is placed between the plates of the adjacent elements. This is preferable in the case of straight teeth shown in FIG. 10, since, at relative displacement of the teeth 20 of the opposite plates 4 for a half-pitch and at a pitch between the inlet and outlet slots higher than a double width of these slots (FIG. 11), the outlet slots 17 may be positioned at the rear side of the inlet slots 10 (FIG. 12). In this case the pass-through sections and discharge capacity of the valve are increased.

The screws 5 fastening the pack 1 run in through holes 23 (FIG. 13) disposed in suitable eyes 24.

The making of round valve plates of a large diameter of a sheet or a wide band is associated with high waste of material. The plates with high teeth are free from this disadvantage, because they can be made of a band with preliminarily cut teeth, in which case the required shape of the ring is obtained by subsequent bending of the band on its rib by the spaces between the teeth.

The toothed plates can also be assembled from toothed segments. In both cases the ends are connected through gas-tight joints, for example dovetailed joints, and the place of connection is secured between the flat portions of the adjoining seats. The opening for a connecting screw can be provided at the same place.

As mentioned above, the suction valves are provided with plates clamped along their external edges, while the delivery valves have plates clamped along their internal edges. However, when the passages communicating the valve with the cylinder space are made in such a manner that the working medium of the suction and delivery valves flows through the valve in a similar way, i.e. from the periphery to the centre or vice versa, both these valves - suction and delivery - may be made similar.

The suction valve installed in the cylinder of a piston compressor operates as follows. As the pressure in the working space of the cylinder drops, the valve plates, previously adjoining the end faces of the seats, bend and open the slots along the contours of the free edges of the plates, thus opening the valve.

In the valves shown in FIG. 1 (to the left) and in FIG. 2 the sucked working medium (gas) is admitted on the side of the external cylindrical surface into the slots 7 and passes through the slot between the seats 3 and the plates 4 into the working chamber of the cylinder on the side of the external cylindrical surface of the valve.

The delivery valve shown in FIG. 1 (to the right) operates in a similar manner, but the flow of working medium is directed in this valve from the internal cylindrical surface to the external surface.

The valves shown in FIGS. 5, 8, 11, 12 operate like the valve shown in FIG. 2, with the difference that the working medium flows through the zigzag slot and leaves the valve through the outlet slots 17.

The inventive direct-flow cylindrical valves have the following advantages. Due to the passages being made in the form of inlet and outlet slots open from the end faces of the seats and due to the presence of teeth on the plates, the pass-through sections of the cylindrical valve are considerably increased. This fact makes it possible not only to reduce energy losses in the valves, but also allows the number and dimensions of the valves to be reduced, while increasing their life due to a low rise of the plates.

The reduction of the energy loss obtained in the proposed direct-flow cylindrical valves makes it possible to increase the speed of the piston compressors in which these valves are employed. In addition, the use of such valves makes it possible to simplify the shape of the cylinders.

These advantages are particularly important in the case of large-size piston compressors with an input power from 1000 kW and with a mean pressure of up to 100 atm, operating at low pressure ratios in the order of 1.2–2.5, for example, in the case of large-size gas-pumping compressors featuring high losses of energy in the valves, where the consumption of power is increased by 20 percent and higher, as compared with the required theoretical value.

We claim:

1. A direct-flow cylindrical valve comprising, in combination: a pack assembled of serially arranged elements, the latter each including ring-shaped members: a seat having end faces and cylindrical surfaces, and at least one flexible plate, said seats and said plates adjoining each other, so that said plates are clamped along one of their circular edges; said seats having passages for inlet of a working medium, said passages being in the form of radial inlet slots disposed along at least one of said end faces of the seats and open at the sides of one of said cylindrical surfaces, so that the medium washes the surfaces of said plates along the entire lengths of said inlet slots, wherein said elements further include rings adjoining said plates at the sides opposite to those which adjoin said seats and having chamfered surfaces on the sides of said plates, to provide for their bending in the open valve, and wherein said seats further include radial outlet slots for the medium, open at the sides of said cylindrical surfaces opposite to those facing openings of said inlet slots, said outlet slots being arranged between said inlet slots on the sides where said plates adjoin said seats, so that in the open valve there is formed a zigzag slot allowing the medium to flow from said inlet slots to said outlet slots.

2. The valve as defined in claim 1, wherein said plates have teeth of different heights and shapes, disposed along contours of said zigzag slot, so that the bases of said teeth are located on the sides of the clamped circular edges of said plates.

3. The valve as defined in claim 2, wherein said teeth of the plates are disposed opposite to respective inlet slots.

4. The valve as defined in claim 2, wherein said teeth of the plates are disposed opposite to several inlet slots.

* * * * *